US012638160B2

(12) United States Patent
Dwight et al.

(10) Patent No.: US 12,638,160 B2
(45) Date of Patent: May 26, 2026

(54) TRANSPORTABLE SINGLE UNIT PARABOLIC LIGHTING SYSTEM

(71) Applicant: Cinelease, LLC, Los Angeles, CA (US)

(72) Inventors: Brian Dwight, Lindsay (CA); Craig Pratt, Whitchurch-Stouffville (CA); David Dwight, Pickering (CA)

(73) Assignee: Cinelease, LLC, Los Angeles, CA (US)

( * ) Notice: Subject to any disclaimer, the term of this patent is extended or adjusted under 35 U.S.C. 154(b) by 0 days.

(21) Appl. No.: 18/640,570

(22) Filed: Apr. 19, 2024

(65) Prior Publication Data

US 2024/0353087 A1 Oct. 24, 2024

Related U.S. Application Data

(60) Provisional application No. 63/461,190, filed on Apr. 21, 2023.

(51) Int. Cl.

| | |
|---|---|
| ***F21V 19/02*** | (2006.01) |
| ***F21L 14/04*** | (2006.01) |
| ***F21V 7/06*** | (2006.01) |
| ***F21V 19/00*** | (2006.01) |

(Continued)

(52) U.S. Cl.

CPC .............. *F21V 19/02* (2013.01); *F21L 14/04* (2013.01); *F21V 7/06* (2013.01); *F21V 19/0005* (2013.01); *F21V 29/61* (2015.01); *F21V 29/67* (2015.01)

(58) Field of Classification Search

CPC ........ F21V 19/02; F21V 7/06; F21V 19/0005; F21V 29/61; F21V 29/67; F21V 21/30; F21L 14/04

See application file for complete search history.

(56) References Cited

U.S. PATENT DOCUMENTS 4,423,471 A * 12/1983 Gordin .................... F21V 29/83 362/264
5,207,747 A * 5/1993 Gordin .................... F21V 23/02 362/264

(Continued)

OTHER PUBLICATIONS

International Search Report, dated Aug. 6, 2024, in connection with PCT/US2024/025437, 3 pages.

(Continued)

*Primary Examiner* — Tsion Tumebo

(74) *Attorney, Agent, or Firm* — Baker & McKenzie LLP

(57) ABSTRACT

The present disclosure relates to a single unit parabolic lighting system including a lamp housing including an outside surface; an inside surface; a lamp mounting located on the centermost part of the inside surface and comprising a locking lamp support configured to accommodate a plurality of pin spacings; and a quick connection and disconnection mounting system; a molded composite yoke comprising a base and an arm extending away from the base, wherein the arm comprises an arm connector having a motorized drive with inductive position feedback that mechanically connects to the outside surface of the lamp housing and is configured to tilt the lamp housing with respect to the arm connector of the yoke about a 120° range; and a truss attachment base comprising a truss connector and a yoke connector having a motorized drive with inductive position feedback that mechanically connects to the base of the molded composite yoke.

20 Claims, 6 Drawing Sheets

(51) Int. Cl.
*F21V 29/61* (2015.01)
*F21V 29/67* (2015.01)

(56) References Cited

U.S. PATENT DOCUMENTS

| | | | | | |
|---|---|---|---|---|---|
| 6,053,623 | A * | 4/2000 | Jones | F21V 7/28 | 362/348 |
| 11,415,301 | B2 * | 8/2022 | Johnson | F21L 4/02 | |
| 11,959,616 | B2 * | 4/2024 | Avery | F21L 13/00 | |
| 2004/0095761 | A1 * | 5/2004 | Esakoff | F21V 19/04 | 362/648 |
| 2007/0147054 | A1 * | 6/2007 | Bornhorst | F21V 14/06 | 362/428 |
| 2009/0052188 | A1 * | 2/2009 | Brinkhoff | H01J 17/26 | 362/296.07 |
| 2013/0215629 | A1 * | 8/2013 | Bornhorst | F21V 21/15 | 362/418 |
| 2015/0137683 | A1 * | 5/2015 | Krames | F21V 23/006 | 315/294 |
| 2016/0273717 | A1 * | 9/2016 | Krames | G02B 6/0073 | |

OTHER PUBLICATIONS

Written Opinion of the International Searching Authority, dated Aug. 6, 2024, in connection with PCT/US2024/025437, 6 pages.

Notification of Transmittal of the International Search Report and the Written Opinion of the International Searching Authority, or the Declaration, dated Aug. 6, 2024, in connection with PCT/US2024/025437, 2 pages.

* cited by examiner

TRANSPORTABLE SINGLE UNIT PARABOLIC LIGHTING SYSTEM

CROSS-REFERENCE SECTION

This Application claims priority to U.S. Provisional Application No. 63/461,190, filed on Apr. 21, 2023, which is incorporated by reference herein in its entirety for all purposes.

FIELD OF THE DISCLOSURE

This application relates to a remotely controlled, weather resistant, high intensity parabolic lighting system that provides multiple axes of rotation with position feedback and adjustable focus.

BACKGROUND

Lighting systems used in the film, concert, stage, theatrical, architectural, trade show, advertising towers, and construction industries are generally mounted on trusses. Trusses are lightweight metal (e.g., steel, aluminum) scaffolds fastened together in various geometries to frame a set.

Known remotely operated lighting systems lack sufficient intensity for large scale lighting applications. Currently available high intensity lighting setups require several pieces of equipment to obtain similar results.

Therefore, lighting systems are needed that are lightweight, flexible, transportable, and easily installable. These fixtures must provide remote tilt (vertical motion), pan (horizontal motion), and focus (linear lamp motion) and should accommodate several lamp wattages and types (daylight or tungsten).

SUMMARY

The present disclosure relates to a single unit parabolic lighting system. The system may include a lamp housing having a bell shape that opens at its largest circumference. The lamp housing may include an outside surface, an inside surface containing a parabolic reflector, and a lamp mounting. The lamp mounting may be located on the centermost part of the inside surface and may include a locking lamp support. The locking lamp support may be configured to accommodate either a 38 mm or a 51 mm power pin spacing, allowing several lamp types (daylight or tungsten) and wattages. In some embodiments, the lamp housing includes an adjustable focus with position feedback and a quick connection and disconnection mounting system. The single unit parabolic lighting system may include a molded composite yoke having a base and two arms that extend in a parallel direction away from the base. Each arm may include an arm connector having a motorized drive with inductive position feedback that may mechanically connect to the outside surface of the lamp housing and may be configured to tilt the lamp housing with respect to each arm connector of the yoke about a 120° range. The single unit parabolic lighting system may include a truss attachment base having two truss connectors and a yoke connector having a motorized drive with inductive position feedback that may mechanically connect to an outside surface of the base of the molded composite yoke and may be configured to pan the yoke with respect to the truss attachment at a 320° range. The single unit parabolic lighting system may include a cooling system having a plurality of fans, pressure sensors, and temperature sensors, where the plurality of fans may operate independently of each other and in response to feedback provided by each of the pressure sensors and the temperature sensors. The single unit parabolic lighting system may include a method to derive control power from the multi voltage/frequency lamp power supply and may be configured to withstand high voltage (60 KV) pulses during lamp ignition.

In some embodiments, the present disclosure relates to a single unit parabolic lighting system. The single unit parabolic lighting system may include a lamp housing that opens at its largest circumference and includes an outside surface; an inside surface; a lamp mounting located on the centermost part of the inside surface and comprising a locking lamp support configured to accommodate a plurality of pin spacings; and a quick connection and disconnection mounting system. The single unit parabolic lighting system may include a molded composite yoke comprising a base and an arm that extends away from the base, wherein the arm includes an arm connector having a motorized drive with inductive position feedback that mechanically connects to the outside surface of the lamp housing and may be configured to tilt the lamp housing with respect to the arm connector of the yoke about a 120° range. The single unit parabolic lighting system may include a truss attachment base comprising a truss connector and a yoke connector having a motorized drive with inductive position feedback that mechanically connects to an outside surface of the base of the molded composite yoke.

In some embodiments, the present disclosure relates to a single unit parabolic lighting system. The single unit parabolic lighting system may include a lamp housing that opens at its largest circumference. The lamp housing may include an outside surface, an inside surface, a lamp mounting located on the centermost part of the inside surface and comprising a locking lamp support configured to accommodate a plurality of pin spacings, and a quick connection and disconnection mounting system. The single unit parabolic lighting system may include a molded composite yoke having a base and two arms that extend in a parallel direction away from the base. Each arm may include an arm connector having a motorized drive with inductive position feedback that mechanically connects to the outside surface of the lamp housing. The single unit parabolic lighting system may include a truss attachment base having a truss connector and a yoke connector having a motorized drive with inductive position feedback that mechanically connects to the outside surface of the base of the molded composite yoke and may be configured to pan the yoke with respect to the truss attachment at a 3200 range.

A lamp housing may include a bell shape. An inside surface includes a parabolic reflector. A locking lamp support may be configured to accommodate at least one of a 38 mm power pin spacing and a 51 mm power pin spacing. The locking lamp support may be configured to accommodate daylight lamp types and tungsten lamp types. The lamp housing further includes an adjustable focus with position feedback. In some embodiments, a molded composite yoke may further include a second arm so that both arms extend in a parallel direction away from the base. The second arm may include a second arm connector having a motorized drive with inductive position feedback that mechanically connects to the outside surface of the lamp housing and may be configured to tilt the lamp housing with respect to each arm connector of the yoke about a 120° range.

A truss attachment base may include a second truss connector. The single unit parabolic lighting system may include a cooling system having a plurality of fans, pressure sensors, and temperature sensors. The plurality of fans may operate independently of each other and in response to feedback provided by each of the pressure sensors and the temperature sensors. The single unit parabolic lighting system may include a device control power from the multi voltage/frequency lamp power supply and configured to withstand high voltage (60 KV) pulses during lamp ignition. The truss attachment base may be configured to pan the yoke with respect to the truss attachment at a 320° range.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale, and the dimensions of various features may be arbitrarily increased or reduced for clarity of discussion.

DETAILED DESCRIPTION

The present disclosure relates to a lightweight, weather-resistant, multi-wattage, multi-source, single unit parabolic lighting system (or "lighting system"), having built-in motorized drives with positional feedback that enable the lighting system to pan (i.e., horizontal motion), tilt (i.e., vertical motion), and focus (i.e., linear lamp motion). The disclosed single unit lighting system may include a quick connection and disconnection mounting system and will accommodate several wattages and lamp types (e.g., daylight or tungsten). The disclosed single unit lighting system may be able to derive control power from a multi voltage/frequency lamp power supply and may be configured to withstand high voltage pulses during lamp ignition. The disclosed lighting system may be configured to attach to any truss, aerial lift, rooftop, grid, pipe, or mounting structure.

A disclosed single unit parabolic lighting system may also be readily transportable in a shipping case and may be quickly and safely secured to a truss or other light mounting structures. In some embodiments, the disclosed lighting system may automatically maintain optimal operating temperature to prevent overheating while also being configurable to use multiple power sources to run.

Figure 1:
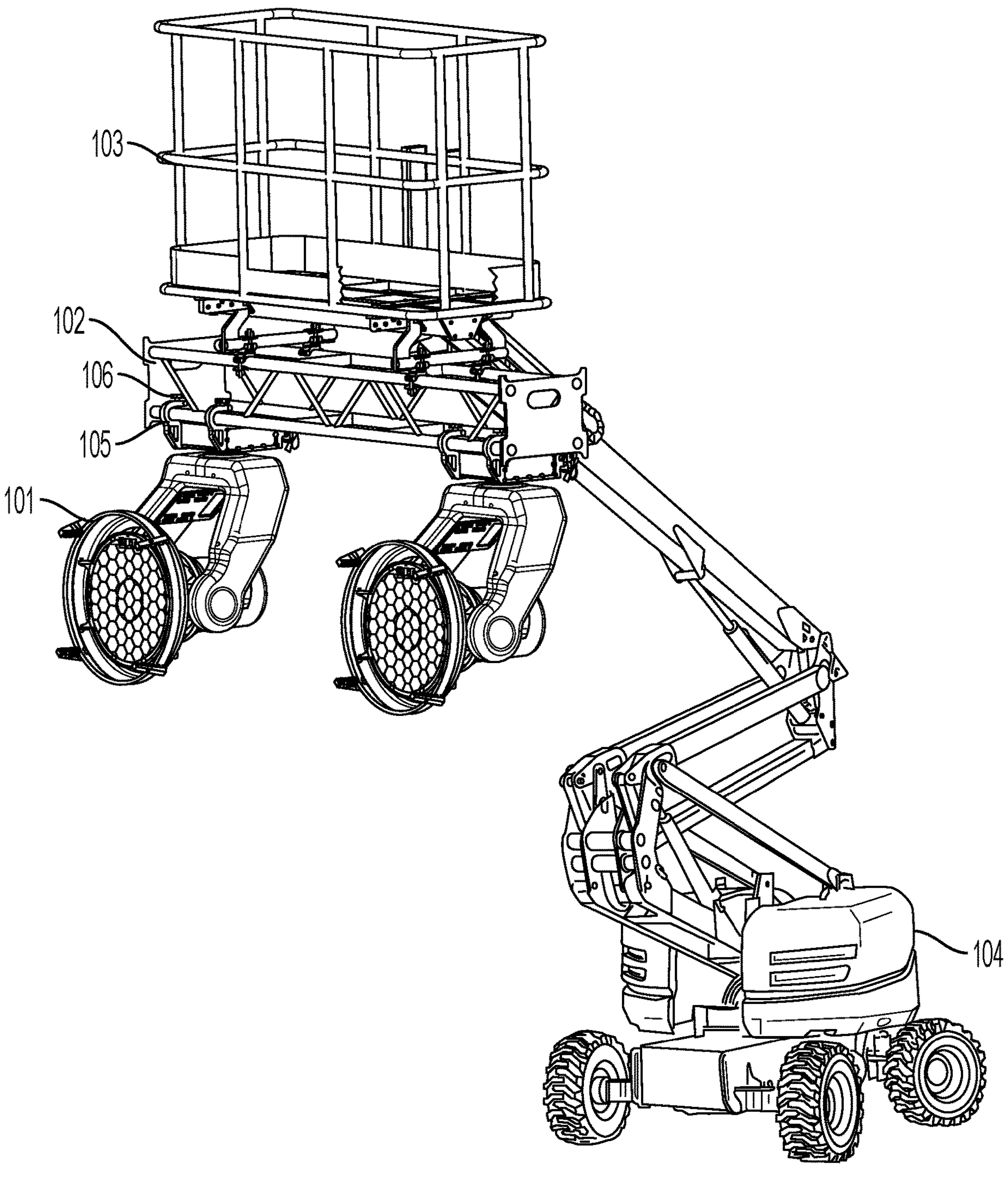
FIG. 1 illustrates a side perspective of a disclosed single unit parabolic lighting system connected to a truss that is attached to a telescopic aerial lift, according to embodiments of the disclosure.

FIG. 1 illustrates a side perspective of a disclosed single unit parabolic lighting system 101 connected to a truss 102, the truss 102 being attached to an aerial lift 104 and a basket 103. Disclosed lighting systems 101 can be attached to a truss 102 or any lighting support structure. In some embodiments, the lighting system 101 may attach to any of steel pipes, trusses 102, cables, or any known hanging structure. As shown in FIG. 1, the single unit parabolic lighting system 101 may include a hook 105, a strap, and a bolt (e.g., tee bolt) 106 for attaching to a truss 102 or any other mounting structure. The hook 105, bolt 106, and strap mounting system may advantageously provide for a convenient, quick, and secure mounting mechanism, not found in known lighting systems. During installation, the lighting system 101 may be initially hung onto the mounting structure (e.g., truss) by the hook 105. A bolt 106 may prevent the single unit parabolic lighting system 101 from becoming accidentally dislodged. Finally, a strap (e.g., ratchet strap) may be connected and tightened to provide secure mounting. Similarly, when being uninstalled, the strap may be disconnected and the bolt 106 may be disengaged without having to provide additional support to the lighting system 101 to prevent it from falling down. Then, when ready, a user may disengage the hook 105 to disengage the lighting system from the mounting structure.

In some embodiments, as shown in FIG. 1, a single unit parabolic lighting system 101 may include two hooks 105, two bolts 106, and two straps (not shown). The disclosed single unit parabolic lighting system 101 may have any number of hooks 105, bolts 106, and straps. For example, the single unit parabolic lighting system 101 may have one hook 105, or two hooks 105, or three hooks 105, or four hooks 105, or five hooks 105, or six hooks 105, or seven hooks 105, or eight hooks 105, or nine hooks 105, or ten hooks 105, or more. For example, the single unit parabolic lighting system 101 may have one bolt 106, or two bolts 106, or three bolts 106, or four bolts 106, or five bolts 106, or six bolts 106, or seven bolts 106, or eight bolts 106, or nine bolts 106, or ten bolts 106, or more. Moreover, the single unit parabolic lighting system 101 may have one strap, or two straps, or three straps, or four straps, or five straps, or six straps, or seven straps, or eight straps, or nine straps, or ten straps, or more.

Disclosed hooks, bolts, and straps may each be made of any known polymer, metal, or composite thereof. For example, the single unit parabolic lighting system 101 may include a high-density polyethylene hook, a steel bolt, and a nylon strap. A polymer may include a nylon, a polyvinyl chloride, a polyethylene, a polypropylene, a polystyrene, a polyethylene terephthalate, a silicone, mixtures thereof, and copolymers thereof. In alternative embodiments, disclosed hooks, bolts, and straps may each be made of a metal, which may include a steel, an aluminum, an iron, a tin, a titanium, a tungsten, a lead, a silver, alloys thereof, and combinations thereof.

Figure 2:
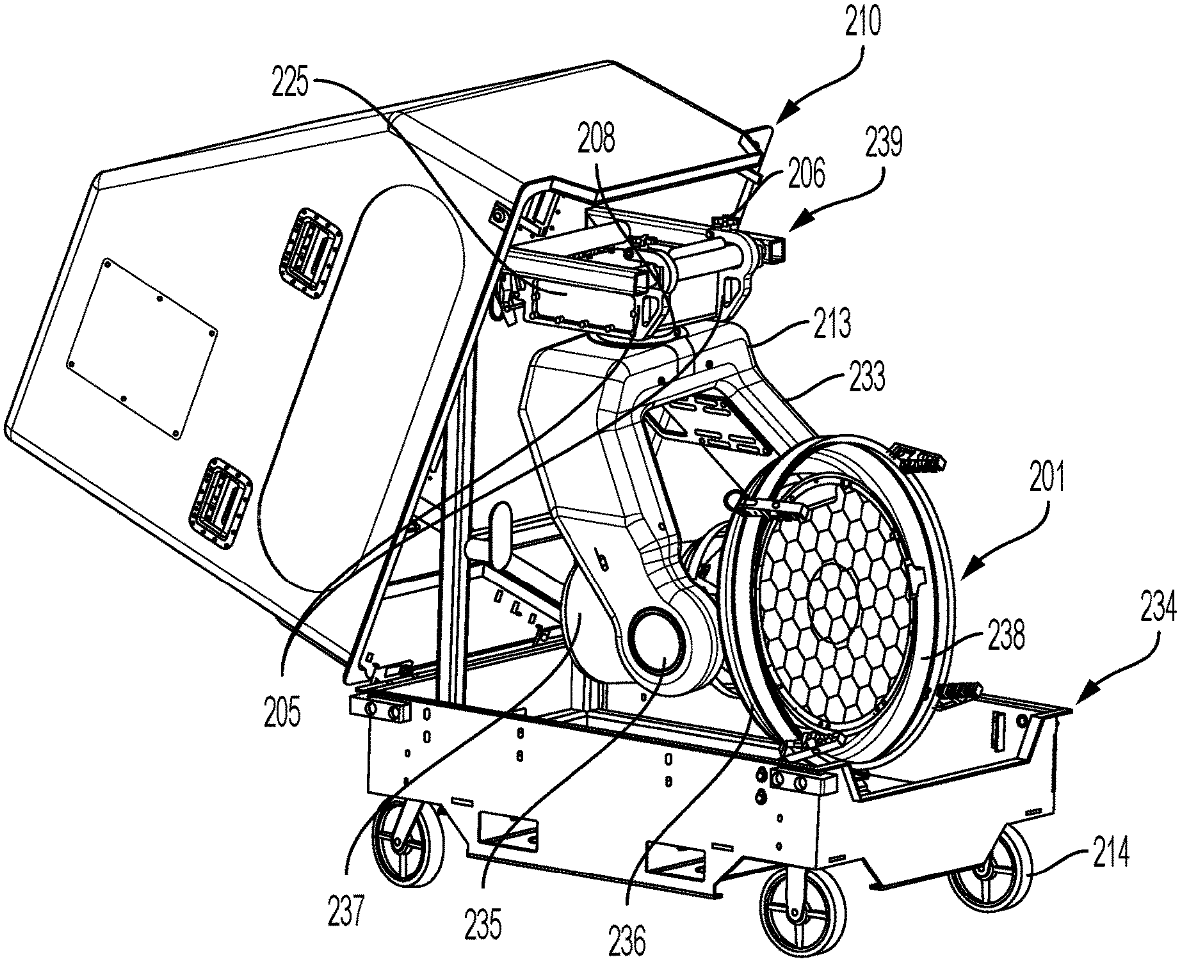
FIG. 2 illustrates a side perspective of a single unit parabolic lighting system held within a shipping case, according to embodiments of the disclosure.

FIG. 2 illustrates a side perspective of a single unit parabolic lighting system 201 held within a shipping case 234. In some embodiments, the disclosed lighting system 201 may be readily transported within the shipping case 234. The lighting system 201 may be rapidly transferred to a truss onsite with a hook 205 and strap mounting system (not visible). As shown in FIG. 2, the disclosed lighting system 201 may include a lamp housing 237 having a bell shape that opens at its largest circumference. The lamp housing 237 may include an outside surface 236 an inside surface 238 comprising a parabolic reflector, and a lamp mounting and supporting mechanism located on the centermost part of the inside surface (not shown). In some embodiments, the lamp housing 237 includes additional shapes, including an open sphere, a hemisphere, an open cylinder, an open cube, an open cone, an open rectangular prism, or any general geometry, including irregular objects.

As shown in FIG. 2, a single unit parabolic lighting system 201 may include a yoke 208. The yoke 208 may include a base 213 and two arms 233 that extend in a parallel direction away from the base 213. In some embodiments, a lighting system 201 may include a molded composite yoke 208 having only one arm 233 or even more than two arms 233. Each arm 233 may include an arm connector 235 having a motorized drive that mechanically connects to an outside surface 236 of the lamp housing 237. The arm connector 235 may be configured to tilt the lamp housing 237 with respect to each arm connector 235 of the yoke 208 at an angle ranging from about +90° to about −90° with respect to a horizontal plane of a floor. For example, the arm connector 235 may be configured to tilt the lamp housing 237 with respect to each arm connector 235 of the yoke 208 at an angle of about −90°, or about −80°, or about −70°, or about −60°, or about −50°, or about −40°, or about −30°, or about −20°, or about −10°, or about 0°, or about 10°, or about 20°, or about 30°, or about 40°, or about 50°, or about 60°, or about 70°, or about 80°, or about 900 with respect to the horizontal plane of the floor, where about includes plus or minus 50°.

A yoke 208 may be made from a metal, a polymer, or a mixture thereof. For example, the yoke 208 may be made from a molded composite polymer. In some embodiments, the yoke 208 may be made of any known metal (e.g., steel) or polymer (e.g., high density polyethylene). For example, the yoke 208 may be made of a metal including a steel, a titanium, a brass, a copper, a lead, an iron, a bronze, an aluminum, a carbon steel, mixtures thereof, and alloys thereof. The yoke 208 may be made of a polymer including a polyethylene, a polystyrene, a polyurethane, a nylon, a polypropylene, a polyethylene terephthalate, a polymethylmethacrylate, a polyacrylonitrile, a polyvinyl chloride, a polycarbonate, a silicone, a polyester, mixtures thereof, and copolymers thereof.

In some embodiments, as shown in FIG. 2, a single unit parabolic lighting system 201 may include a truss attachment base 225 having one or more truss connectors and a yoke connector (not visible). The truss connector may include a hook 205. In some embodiments, the hook 205 may connect the lighting system 201 to a chord 239 of a truss. The truss connector may include a bolt 206 and a strap (not pictures). In some embodiments, the truss connector includes a plurality of hooks 205, bolts 206, and straps. The yoke connector may include a motorized drive that mechanically connects to the yoke 208 and may be configured to pan the yoke 208 with respect to the truss attachment base 225 at an angle ranging from about −160° to about +160°. For example, the yoke 208 may be configured to pan the yoke 208 with respect to the truss attachment base 225 at an angle of about −160°, or about −140°, or about −120°, or about −100°, or about −80°, or about −60°, or about −40°, or about −20°, or about 0°, or about 20°, or about 40°, or about 60°, or about 80°, or about 100°, or about 120°, or about 140°, or about 160°, where about includes plus or minus 10°. The yoke connector may connect to an outside surface of the base 225 of the molded composite yoke 208. For example, the yoke connector may include a motorized drive that mechanically connects to the yoke 208 and may be configured to pan the yoke 208 with respect to the truss attachment base 225 at a total angle range of about 3200.

As shown in FIG. 2, a single unit parabolic lighting system 201 may be stored in a shipping case 234 having a cover 210 with locks and castors 214 on the base of the shipping case 234. A shipping case 234 may include data cables and controllers for the lighting system 201.

Figure 3:
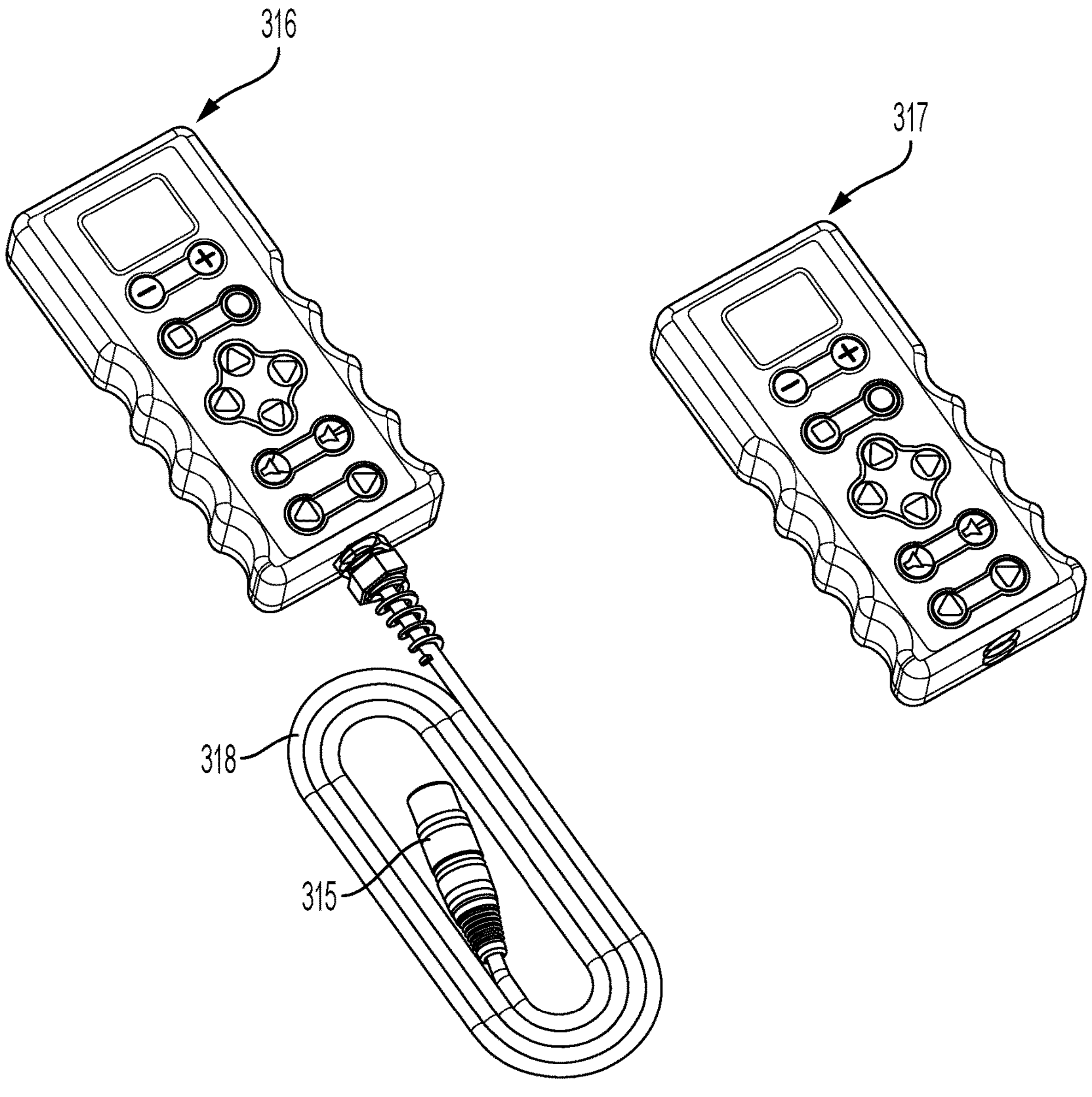
FIG. 3 illustrates a side perspective view of a wired and a wireless bi-directional controller, according to embodiments of the disclosure.

In some embodiments, as shown in FIG. 3, a single unit parabolic lighting system may be controlled by a controller. For example, the disclosed lighting system may be controlled by a wired controller 316, wireless controller 317, a remote device management (RDM) controller, a digital multiplex (DMX) controller, or any industry standard lighting console. Each controller may provide for selection of various modes based on speed, position, and directional control of the disclosed lighting system. As shown in FIG. 3, the wired controller 316 may include a wire 318 and connector 315, which may be any needed length or diameter. In some embodiments, a disclosed lighting system may use novel feedback systems to control each of the pan and tilt axes, where positional feedback may be achieved through touchless inductive proximity detection. The controller may adjust any of pan (i.e., horizontal motion), tilt (i.e., vertical motion), and focus (i.e., linear lamp motion) of the disclosed lighting system. The controller may also turn on or off a lamp of the disclosed lighting system. In some embodiments, focus may provide continuously variable beam width adjustment of the lamp in a at a range from about 16° to about 48°. For example, disclosed single unit parabolic lighting systems may have a linear lamp motion, or focus, of about 16° or about 20° or about 24°, or about 28° or about 32°, or about 36°, or about 40° or about 44°, or about 48° where about includes plus or minus 2°.

Figure 4:
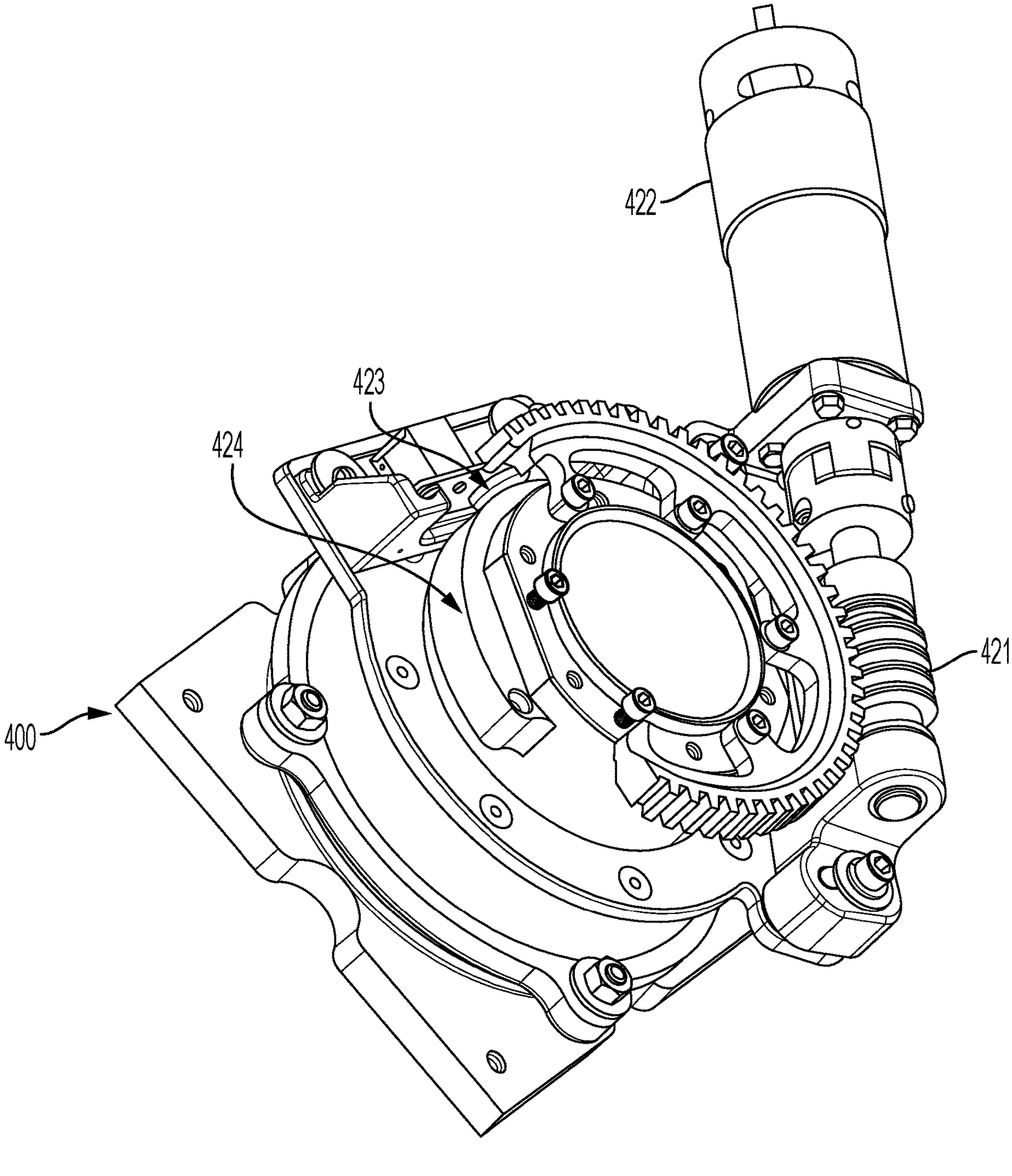
FIG. 4 illustrates a side perspective of a motor drive with a feedback system for controlling and positioning the pan and tilt axes of a single unit parabolic lighting system, according to embodiments of the disclosure.

As shown in FIG. 4, a single unit parabolic lighting system may include a distance sensor assembly 400 for determining an orientation and position of the disclosed lighting system. The distance sensor assembly may include a distance sensor 422 connected to an end of a helically cut gear 421. The helically cut gear 421 may engage a circular straight cut gear 423 so that the position of the distance sensor 422 may extend and retract along the same axis as the helically cut gear 421. The straight cut gear 423 extends outward from a base 424. The base 424 may be configured to attach to various parts of the disclosed lighting system via adhesive, screw, bolt, or any other known methods. In some embodiments, through determining the distance of the distance sensor 422 from the helically cut gear 421, the lighting system may determine the orientation of an axis of the lighting system. A distance sensor assembly 400 may provide numeric position and axis angle related information that may be applied to a look up table which translates this information to an absolute position. The look up table may be created by running a calibration program. In some embodiments, a distance sensor may include an inductive distance sensor, a capacitive distance sensor, a through-beam distance sensor, a retro-reflective distance sensor, an ultrasonic distance sensor, and combinations thereof.

Figure 5:
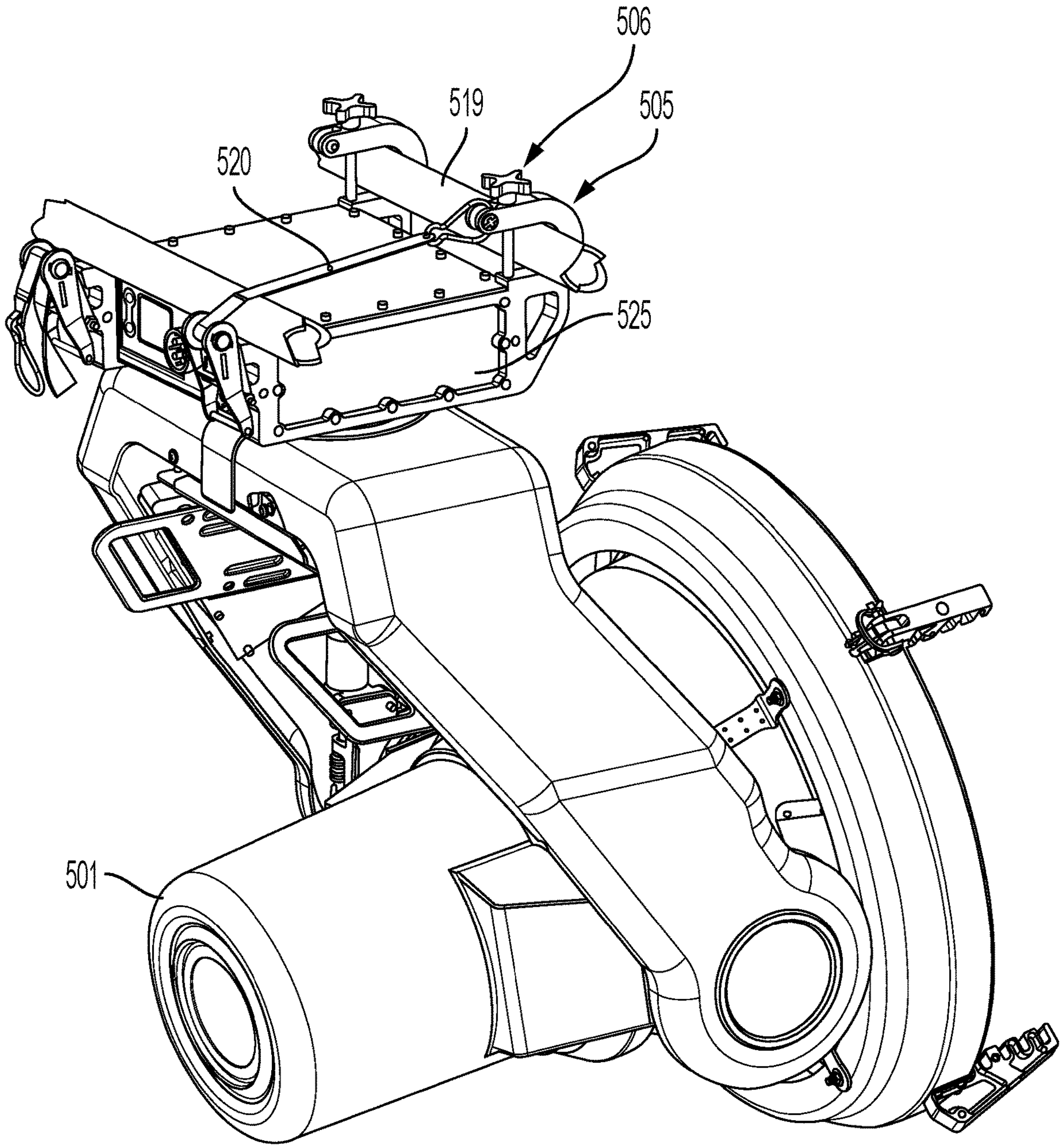
FIG. 5 illustrates a rear-side perspective of a single unit parabolic lighting system attached to a truss through a tee bolt, a hanger assembly hook, and a ratchet assembly, according to embodiments of the disclosure.

FIG. 5 depicts a disclosed lighting system 501 attached to a chord 519 of a truss. As shown in FIG. 5, a hook 505 of the lighting system 501 may enclose a portion of the chord 519. The lighting system 501 may include two hooks 505. The lighting system 501 may include a bolt 506 configured to thread through a portion of the hook 505 and to thread into a truss attachment base 225. Once threaded, the lighting system 501 has a closed loop around the chord 519 of the truss. In some embodiments, as shown in FIG. 5, the lighting system 501 may include a ratchet assembly 520 having ratchet straps. The ratchet straps of the ratchet assembly 520 may connect to the hook 505 and then wrap around both truss chords 519 to firmly secure the lighting system 501 to the truss. In some embodiments, a portion of the ratchet assembly 520 may attach to and protrude out of the truss attachment base 525.

Figure 6:
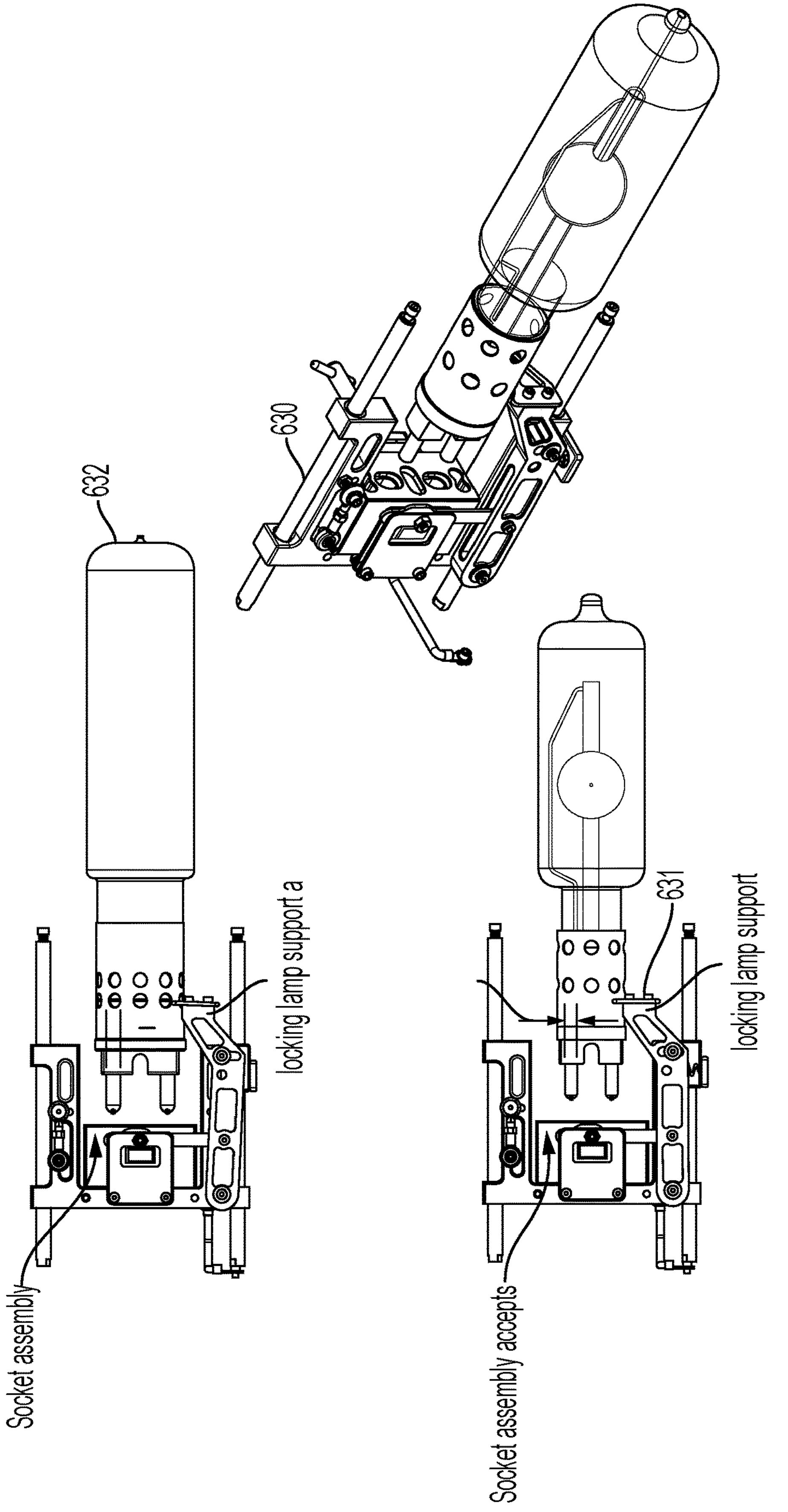
FIG. 6 illustrates a locking lamp support which will accommodate different diameter lamps and a socket that will accept a 38 mm or a 51 mm lamp base, according to embodiments of the disclosure.

As shown in FIG. 6, a disclosed single unit parabolic lighting system may include a lamp mount 630 that is configured to support a variety of lamp 632 sizes. For example, the lamp mount 630 may be configured to support a lamp 632 having a lamp base with a diameter of about 38 mm or about 51 mm, an advantage of known lamp sockets that only accept one. For example, the lamp mount 630 may be configured to support a lamp 632 having a lamp base with a diameter of about 10 mm, or about 15 mm, or about 20 mm, or about 25 mm, or about 30 mm, or about 35 mm, or about 40 mm, or about 45 mm, or about 50 mm, or about 55 mm, or about 60 mm, where about includes plus or minus 5 mm.

Disclosed lamp mounts 630 may include a locking lamp support 631 configured to accommodate and secure lamp bases having various diameters. For example, the locking lamp support 631 may accommodate and secure a lamp base with a diameter of about 38 mm or about 51 mm. Additionally, the locking lamp support may accommodate and secure a lamp base with a diameter of about 10 mm, or about 15 mm, or about 20 mm, or about 25 mm, or about 30 mm, or about 35 mm, or about 40 mm, or about 45 mm, or about 50 mm, or about 55 mm, or about 60 mm, where about includes plus or minus 5 mm. Once a lamp 632 is inserted into the lamp mount 630, the locking lamp support 631 may support a weight of the lamp 632. The locking lamp support 631 may be a spring-loaded support bracket that presses against the lamp 632 while supporting the lamp's weight, which may reduce stress on contact points between the lamp 632 and the lamp mount 630. When a lamp 632 is locked into place, the now positioned locking lamp support 631 is mechanically locked into position. In some embodiments, the disclosed locking lamp support 631 removes a problem of spring tension having to accommodate several different lamp diameters and weights.

A disclosed lighting system may accommodate various lamp types, including, but not limited to, tungsten and daylight lamps of various shapes, sizes, and power ratings. For example, the lighting system may accommodate lamps including an HMI (daylight lamps) from 6-18 Kw as well as a tungsten lamp having a power rating of from about 10 Kw to about 12 Kw 10-12 Kw. The lighting system may accommodate a lamp having a power rating of about 1 Kw, or about 2 Kw, or about 4 Kw, or about 6 Kw, or about 8 Kw, or about 10 Kw, or about 12 Kw, or about 14 Kw, or about 16 Kw, or about 18 Kw, or about 20 Kw, or more, where about includes plus or minus 1 Kw. In some embodiments, the disclosed lighting system may be configured to derive control power from the multi voltage/frequency lamp power supply and may be configured to withstand high voltage (60 KV) pulses during lamp ignition.

A disclosed single unit parabolic lighting system may include a cooling system including a plurality of fans; pressure sensors; and temperature sensors, wherein the plurality of fans operate independently of each other and in response to feedback provided by each of the pressure sensors and the temperature sensors. For example, when the air is cold and low air flow rates are needed, a fan may run more slowly, reducing noise levels while saving power. If a cooling system detects a sudden pressure loss, the cooling system may signal that the lens has broken and shut down the lighting system until it can be repaired. In some embodiments, when power to the lighting system is turned off, the power system (e.g., battery) may continue to power the cooling system until the lighting system cools to an appropriate temperature, 60° C. or less. The cooling system may cool the lighting system to a temperature of about 100° C., or about 90° C., or about 80° C., or about 70° C., or about 60° C., or about 50° C., or about 40° C., or about 30° C., or about 20° C., or about 10° C., where about includes plus or minus 5° C.

In some embodiments, a disclosed single unit parabolic lighting system may include various power configurations for powering the lighting system. Power sources may include a battery (recharged during operation), U-ground or house power, and ballast supported power. For ballast supported power, the lighting system may draw a small amount of power from the lamp circuit to operate disclosed lighting systems and recharge the battery. If no power source is connected, the lighting system may use battery power to determine if a ballast is connected. When a ballast is connected, battery power may enable a safety loop found within the lighting system. The safety loop may include a 220-volt AC circuit used to disable the external lamp power supply to prevent electrocution or overheating. Triggering events may include fan failure or open access doors. In the event that lamp power is not available for an electronic control system auxiliary; power may be supplied via an about 60 vac input to an about 240 vac input. In some embodiments, the power may be supplied via an about 60 vac input, or about 80 vac input, or about 100 vac input, or about 120 vac input, or about 140 vac input, or about 160 vac input, or about 180 vac input, or about 200 vac input, or about 220 vac input, or about 240 vac input, where about includes plus or minus 10 vac.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer, or section. That is, terms such as "first," "second," and other numerical terms, when used herein, do not imply a sequence or order unless clearly indicated by the context. Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A single unit parabolic lighting system comprising:

(a) a lamp housing that opens at its largest circumference and comprises:

(i) an outside surface;

(ii) an inside surface;

(iii) a lamp mounting located on the centermost part of the inside surface and comprising a locking lamp support configured to accommodate a plurality of pin spacings; and (iv) a quick connection and disconnection mounting system;

(b) a molded composite yoke comprising a base and an arm that extends away from the base, wherein the arm comprises an arm connector having a motorized drive with inductive position feedback that mechanically connects to the outside surface of the lamp housing and is configured to tilt the lamp housing with respect to the arm connector of the yoke about a 120° range;

(c) a truss attachment base comprising a truss connector and a yoke connector having a motorized drive with inductive position feedback that mechanically connects to an outside surface of the base of the molded composite yoke; and (d) a distance sensor assembly comprising an inductive distance sensor connected to an end of a helically cut gear, wherein an orientation of an axis of the lighting system may be determined by the distance of the inductive distance sensor from the helically cut gear.

2. The single unit parabolic lighting system according to claim 1, wherein the lamp housing comprises a bell shape.

3. The single unit parabolic lighting system according to claim 1, wherein the inside surface comprises a parabolic reflector.

4. The single unit parabolic lighting system according to claim 1, wherein at least one of:

the locking lamp support is configured to accommodate at least one of a 38 mm power pin spacing and a 51 mm power pin spacing, and the locking lamp support is configured to accommodate daylight lamp types and tungsten lamp types.

5. The single unit parabolic lighting system according to claim 1, wherein the lamp housing further comprises an adjustable focus with position feedback.

6. The single unit parabolic lighting system according to claim 1, wherein the molded composite yoke further comprises a second arm so that both arms extend in a parallel direction away from the base, wherein the second arm comprises a second arm connector having a motorized drive with inductive position feedback that mechanically connects to the outside surface of the lamp housing and is configured to tilt the lamp housing with respect to each arm connector of the yoke about a 120° range.

7. The single unit parabolic lighting system according to claim 1, wherein the truss connector comprises at least one of a hook, a bolt, and a strap.

8. The single unit parabolic lighting system according to claim 1, further comprising:

a cooling system comprising a plurality of fans; pressure sensors; and temperature sensors, wherein the plurality of fans operate independently of each other and in response to feedback provided by each of the pressure sensors and the temperature sensors.

9. The single unit parabolic lighting system according to claim 1, further comprising:

device control power from the multi voltage/frequency lamp power supply and configured to withstand high voltage (60 KV) pulses during lamp ignition.

10. The single unit parabolic lighting system according to claim 1, wherein the truss attachment base is configured to pan the yoke with respect to the truss attachment at a 320° range.

11. A single unit parabolic lighting system comprising:

(a) a lamp housing that opens at its largest circumference and comprises:

(i) an outside surface;

(ii) an inside surface;

(iii) a lamp mounting located on the centermost part of the inside surface and comprising a locking lamp support configured to accommodate a plurality of pin spacings; and (iv) a quick connection and disconnection mounting system;

(b) a molded composite yoke comprising a base and two arms that extend in a parallel direction away from the base, wherein each arm comprises an arm connector having a motorized drive with inductive position feedback that mechanically connects to the outside surface of the lamp housing; and (c) a truss attachment base comprising a truss connector and a yoke connector having a motorized drive with inductive position feedback that mechanically connects to an outside surface of the base of the molded composite yoke and is configured to pan the yoke with respect to the truss attachment at a 320° range, and (d) a distance sensor assembly comprising an inductive distance sensor connected to an end of a helically cut gear, wherein an orientation of an axis of the lighting system may be determined by the distance of the inductive distance sensor from the helically cut gear.

12. The single unit parabolic lighting system according to claim 11, wherein the arm connector is configured to tilt the lamp housing with respect to the arm connector of the yoke about a 120° range.

13. The single unit parabolic lighting system according to claim 11, wherein the truss connector comprises at least one of a hook, a bolt, and a strap.

14. The single unit parabolic lighting system according to claim 11, wherein the inside surface comprises a parabolic reflector.

15. The single unit parabolic lighting system according to claim 11, wherein the locking lamp support is configured to accommodate at least one of a 38 mm power pin spacing and a 51 mm power pin spacing.

16. The single unit parabolic lighting system according to claim 11, wherein the lamp housing further comprises an adjustable focus with position feedback.

17. The single unit parabolic lighting system according to claim 11, further comprising a cooling system.

18. The single unit parabolic lighting system according to claim 17, wherein the cooling system comprises:

a plurality of fans; pressure sensors; and temperature sensors, wherein the plurality of fans operate independently of each other and in response to feedback provided by each of the pressure sensors and the temperature sensors.

19. The single unit parabolic lighting system according to claim 11, further comprising:

a device control power from the multi voltage/frequency lamp power supply and configured to withstand high voltage (60 KV) pulses during lamp ignition.

20. The single unit parabolic lighting system according to claim 11, wherein the locking lamp support is configured to accommodate daylight lamp types and tungsten lamp types.

* * * * *